US008204545B2

(12) United States Patent
Shimasaki

(10) Patent No.: US 8,204,545 B2
(45) Date of Patent: Jun. 19, 2012

(54) COUPLER AND ELECTRONIC APPARATUS

(75) Inventor: Hiroshi Shimasaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/031,004

(22) Filed: Feb. 18, 2011

(65) Prior Publication Data

US 2011/0207404 A1 Aug. 25, 2011

(30) Foreign Application Priority Data

Feb. 19, 2010 (JP) ................................. 2010-035034

(51) Int. Cl.
*H04M 1/00* (2006.01)

(52) U.S. Cl. .................. 455/562.1; 455/575.7; 455/121; 343/702

(58) Field of Classification Search ............... 455/562.1, 455/575.7, 121, 129, 63.4, 13.3, 19, 83, 575.1, 455/90.3; 343/702, 700 MS
See application file for complete search history.

(56) References Cited

U.S. PATENT DOCUMENTS

| | | | | |
|---|---|---|---|---|
| 4,069,483 | A * | 1/1978 | Kaloi | 343/700 MS |
| 4,675,685 | A * | 6/1987 | Finken | 343/708 |
| 5,121,127 | A | 6/1992 | Toriyama | |
| 5,933,330 | A * | 8/1999 | Beutler et al. | 361/814 |
| 6,031,495 | A * | 2/2000 | Simmons et al. | 343/702 |
| 6,255,995 | B1 | 7/2001 | Asano et al. | |
| 6,538,607 | B2 * | 3/2003 | Barna | 343/702 |
| 6,563,463 | B1 | 5/2003 | Saito | |
| 6,650,294 | B2 * | 11/2003 | Ying et al. | 343/700 MS |
| 6,795,025 | B2 | 9/2004 | Saito | |
| 6,961,028 | B2 * | 11/2005 | Joy et al. | 343/895 |
| 7,256,743 | B2 * | 8/2007 | Korva | 343/702 |
| 7,304,611 | B2 | 12/2007 | Yuanzhu | |
| 7,315,289 | B2 * | 1/2008 | Puente Baliarda et al. | 343/817 |
| 7,415,248 | B2 * | 8/2008 | Andersson et al. | 455/90.3 |

(Continued)

FOREIGN PATENT DOCUMENTS

JP H02-179102 7/1990

(Continued)

OTHER PUBLICATIONS

Notice of Rejection mailed by the Japan Patent Office on Jun. 7, 2011 in corresponding Japanese patent app. No. 2010-035034 in 8 pages.

(Continued)

*Primary Examiner* — Minh D Dao
(74) *Attorney, Agent, or Firm* — Knobbe, Martens, Olson & Bear, LLP

(57) ABSTRACT

According to one embodiment, a coupler which transmits and receives an electromagnetic wave to and from another coupler includes a substrate, a coupling element, a ground plane, and a feed terminal. The coupling element is positioned at a first surface of the substrate and includes a feed point. The ground plane is positioned at a second surface of the substrate. The ground plane includes a base portion and a protrusion. A first surface of an end of the protrusion is in contact with the second surface of the substrate. The base portion faces the second surface of the substrate with a gap therebetween. The feed terminal is positioned at a second surface of the end of the protrusion and connected to the feed point of the coupling element via a first through-hole in the substrate.

15 Claims, 14 Drawing Sheets

U.S. PATENT DOCUMENTS

| | | | | |
|---|---|---|---|---|
| 7,592,969 | B2 * | 9/2009 | Proctor et al. | 343/893 |
| 7,756,556 | B2 * | 7/2010 | Patel et al. | 455/575.7 |
| 7,800,543 | B2 * | 9/2010 | Humphrey | 343/700 MS |
| 7,994,984 | B2 * | 8/2011 | Inoue et al. | 343/700 MS |
| 2003/0098812 | A1 * | 5/2003 | Ying et al. | 343/702 |
| 2003/0169204 | A1 | 9/2003 | Saito | |
| 2004/0053635 | A1 * | 3/2004 | Haapala et al. | 455/522 |
| 2004/0058723 | A1 * | 3/2004 | Mikkola et al. | 455/575.7 |
| 2004/0263400 | A1 | 12/2004 | Yuanzhu | |
| 2005/0195124 | A1 * | 9/2005 | Puente Baliarda et al. | 343/893 |
| 2006/0170600 | A1 * | 8/2006 | Korva | 343/702 |
| 2009/0102677 | A1 * | 4/2009 | Patel et al. | 340/693.5 |
| 2009/0243940 | A1 * | 10/2009 | Humphrey | 343/700 MS |
| 2009/0284433 | A1 | 11/2009 | Tsutsumi et al. | |
| 2011/0241950 | A1 * | 10/2011 | Milosavljevic et al. | 343/702 |

FOREIGN PATENT DOCUMENTS

| | | |
|---|---|---|
| JP | H06-177629 | 6/1994 |
| JP | 2000-196341 | 7/2000 |
| JP | 2000-332523 | 11/2000 |
| JP | 2002-261540 | 9/2002 |
| JP | 2005-039754 | 2/2005 |
| JP | 2006-166041 | 6/2006 |
| JP | 2006-197449 | 7/2006 |
| JP | 2007-194707 | 8/2007 |
| JP | 2009-278535 | 11/2009 |

OTHER PUBLICATIONS

Information Sheet for Preparing an Information Disclosure Statement.

* cited by examiner

COUPLER AND ELECTRONIC APPARATUS

CROSS-REFERENCE TO RELATED APPLICATIONS

This application is based upon and claims the benefit of priority from Japanese Patent Application No. 2010-035034, filed Feb. 19, 2010, the entire contents of which are incorporated herein by reference.

FIELD

Embodiments described herein relate generally to a coupler and an electronic apparatus for transmitting/receiving an electromagnetic wave.

BACKGROUND

Recently, a close proximity wireless communication technique has been developed. The close proximity wireless communication technique enables communication between two devices placed close to each other. Each of the devices having the close proximity wireless communication function includes a coupler. When the two devices are brought into proximity within a communication range, the couplers of the two devices are electromagnetically coupled with each other. Therefore, these devices can wirelessly transmit/receive signals to/from each other.

For example, a typical coupler includes a coupling element, an electrode pole, a resonant stub, a ground plane, and the like. A signal is supplied to the coupling element via the resonant stub and the electrode pole. As a result, an electric current flows in the coupling element, which generates an electromagnetic field around the coupler. This electromagnetic field enables an electromagnetic coupling between the couplers of the two devices placed in proximity to each other.

The characteristics of the coupler are affected by a distance between the coupling element and the ground plane, e.g., the length of the electrode pole. When the distance between the coupling element and the ground plane is too short, a portion of the electromagnetic field is likely to flow into the ground plane via the space due to the coupling between the coupling element and the ground plane. Accordingly, energy loss occurs to reduce the electromagnetic coupling between the couplers.

When the coupling element and the ground plane are positioned such that the distance between the coupling element and the ground plane is long, the coupling between the coupling element and the ground plane can be avoided. However, when the distance between the coupling element and the ground plane is long, the size of the coupler, i.e., the height of the coupler, increases.

Jpn. Pat. Appln. KOKAI Publication No. 2006-197449 discloses an antenna including a radiating conductor, two short-circuit pins, and a ground plane conductor. In this antenna, the radiating conductor is designed to have an axisymmetric shape with respect to a perpendicular line passing through a center axis of the ground plane conductor, so that the antenna achieves a low profile.

In Jpn. Pat. Appln. KOKAI Publication No. 2006-197449, however, energy loss caused by the coupling between the coupling element and the ground plane conductor is not taken into consideration. Therefore, it is necessary to realize a new technique in order to make a coupler having a low profile while reducing energy loss.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a coupler which transmits and receives an electromagnetic wave to and from another coupler includes a substrate, a coupling element, a ground plane, and a feed terminal. The coupling element is positioned at a first surface of the substrate and includes a feed point. The ground plane is positioned at a second surface of the substrate. The ground plane includes a base portion and a protrusion. A first surface of an end of the protrusion is in contact with the second surface of the substrate. The base portion faces the second surface of the substrate with a gap therebetween. The feed terminal is positioned at a second surface of the end of the protrusion and connected to the feed point of the coupling element via a first through-hole in the substrate.

Figure 1:
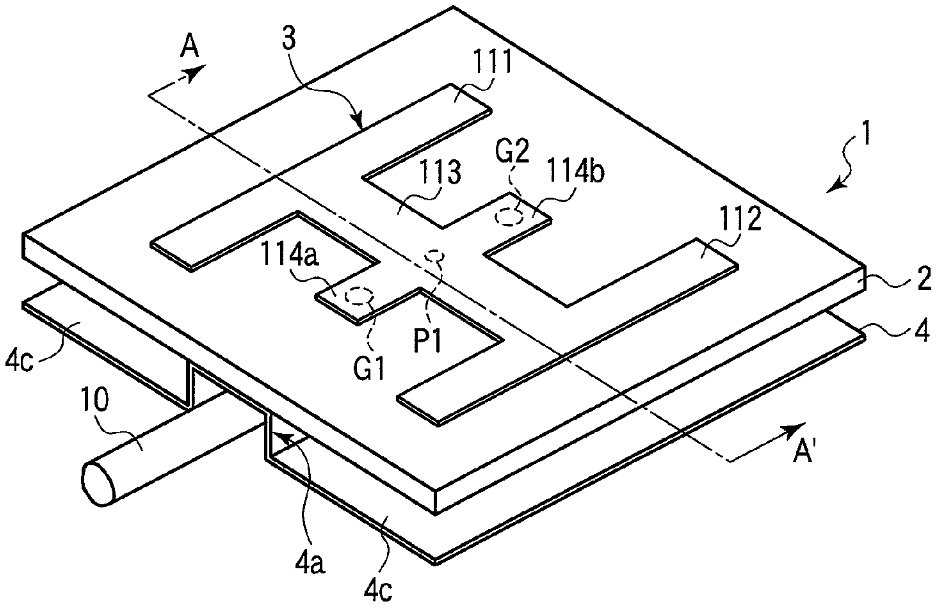
FIG. 1 is an exemplary perspective view illustrating a structure of a coupler according to an embodiment.
Figure 2:
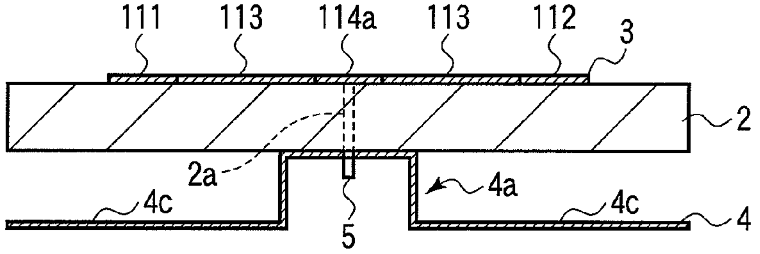
FIG. 2 is an exemplary sectional view illustrating the structure of the coupler according to the embodiment.
Figure 3:
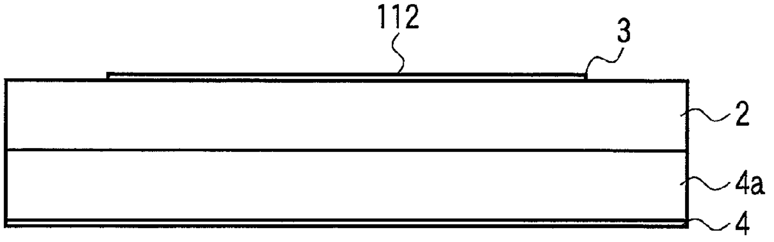
FIG. 3 is an exemplary side view illustrating the structure of the coupler according to the embodiment.
Figure 4:
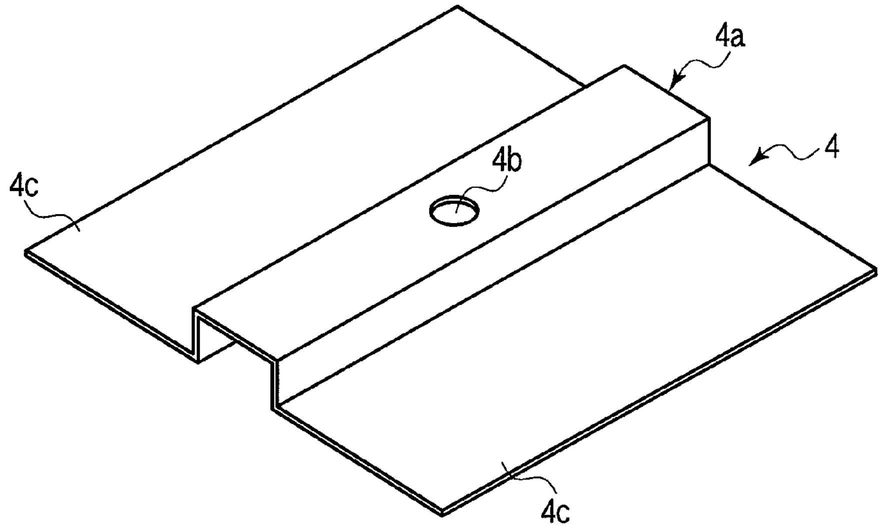
FIG. 4 is an exemplary perspective view illustrating a shape of a ground plane included in the coupler according to the embodiment.
Figure 5:
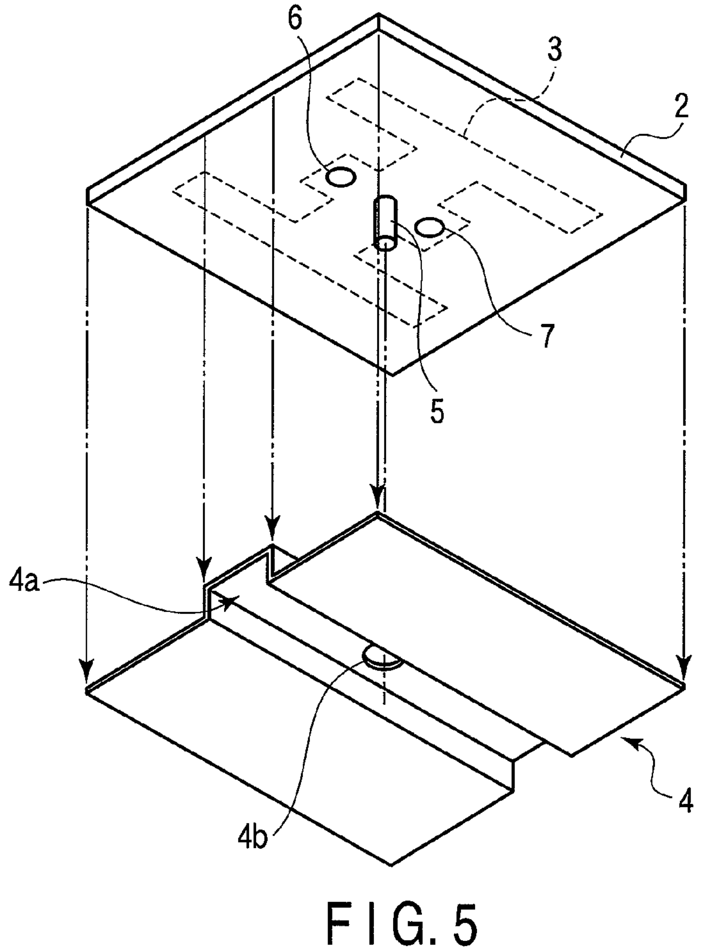
FIG. 5 is an exemplary exploded perspective view, seen from bottom, illustrating the coupler according to the embodiment.
Figure 6:
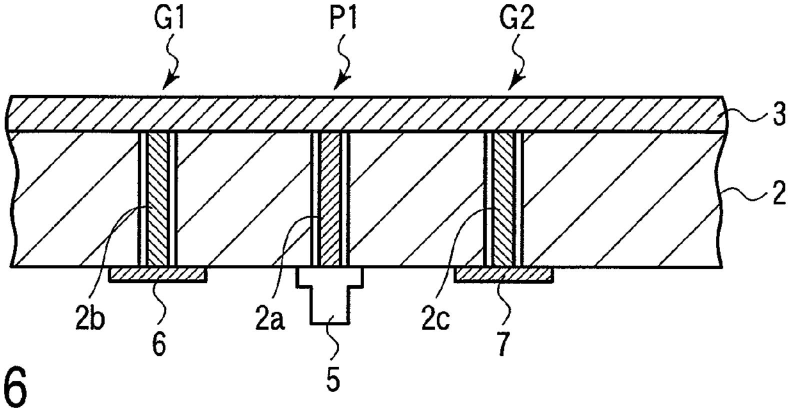
FIG. 6 is an exemplary sectional view illustrating a dielectric substrate included in the coupler according to the embodiment.

First, a structure of a coupler 1 according to an embodiment will be described with reference to FIGS. 1 to 6. FIG. 1 is a perspective view illustrating the coupler 1. FIG. 2 is a sectional view taken along line A-A' of FIG. 1 to illustrate the coupler 1. FIG. 3 is a side view illustrating the coupler 1 seen from a right lateral surface side. FIG. 4 is a perspective view illustrating a shape of a ground plane included in the coupler 1. FIG. 5 is an exploded perspective view illustrating the coupler 1 seen from a lower side. FIG. 6 is a sectional view illustrating a cross sectional structure of a dielectric substrate included in the coupler 1.

The coupler 1 transmits/receives an electromagnetic wave with an electromagnetic coupling with another coupler. The coupler 1 is used for close proximity wireless communication. In the close proximity wireless communication, data is transferred between devices placed in proximity to each other. For example, TransferJet (registered trademark) may be used as the close proximity wireless communication method. The TransferJet is a close proximity wireless communication method using Ultra Wide Band (UWB). When two devices are brought into proximity within a communication range (for example, 3 cm), the couplers of these devices are electromagnetically coupled with each other, whereby these devices can wirelessly transmit/receive signals to/from each other.

As shown in FIGS. 1 to 5, the coupler 1 includes a substrate 2, a coupling element 3, and a ground plane 4. Each of the substrate 2, the coupling element 3, and the ground plane 4 has a planar shape.

The substrate 2 is, for example, a base member including a dielectric material. In the description below, the substrate 2 is referred to as a dielectric substrate. The coupling element 3 is positioned on, for example, a surface of the dielectric substrate 2. The coupling element 3 forms an electrode (coupling electrode) having a planar shape. This coupling electrode 3 is positioned on the surface of the dielectric substrate 2. The ground plane 4 is made of, for example, a metal plane. The ground plane 4 is positioned on a back surface side of the dielectric substrate 2.

The ground plane 4 includes a protrusion **4*a* and a remaining portion (base portion) 4*c*. The protrusion 4*a* is formed by bending a portion of the ground plane 4, e.g., a central portion of the ground plane 4. The remaining portion (base portion) 4*c* is a portion other than the protrusion 4*a*. A first surface of an upper end of the protrusion 4*a* is in contact with the back surface of the dielectric substrate 2. The portions other than the protrusion 4*a*, i.e., the base portion 4*c*, are positioned on both sides of the protrusion 4*a*. The base portion 4*c* faces the back surface of the dielectric substrate 2 with a gap therebetween. Therefore, there is a gap between the base portion 4*c* and the coupling element 3 on the dielectric substrate 2. For example, the upper end of the protrusion 4*a* may be flat. As shown in FIGS. 4 and 5, the protrusion 4*a* extends from one side end of the ground plane 4 to the opposite side end thereof, so as to cross the ground plane 4** from the one side end to the opposite side end.

As shown in FIG. 2, the back surface of the end of the protrusion **4*a* includes a feed terminal 5 connected to a feed point P1 of the coupling element 3 via the dielectric substrate 2. The feed terminal 5 serves as a connector for connecting a feeder cable (for example, coaxial cable). Therefore, as shown in FIG. 1, a groove-shaped space in the inside of the protrusion 4*a* can be used as a space for housing a feeder cable (for example, coaxial cable) 10. A signal is fed to the feed point P1 of the coupling element 3 via the feeder cable 10, the feed terminal 5, and a first through-hole 2*a***.

As shown in FIGS. 5 and 6, the feed terminal 5 may be attached to the back surface of the dielectric substrate 2. As shown in FIG. 6, the feed terminal 5 is connected to the feed point P1 of the coupling element 3 via the first through-hole **2*a* of the dielectric substrate 2. As shown in FIG. 4, the upper end (upper surface) of the protrusion 4*a* includes a through-hole 4*b*. The feed terminal 5 passes through the through-hole 4*b*, and extends and protrudes from the back surface side of the upper end of the protrusion 4*a*. The feed terminal 5 and the protrusion 4*a* (i.e., ground plane 4) are electrically insulated. For insulation, a surrounding area of the through-hole 4*b* and an inner peripheral surface of the through-hole 4*b*** may be coated with an insulating member.

Further, the upper end of the protrusion **4*a* is electrically connected to short-circuit points G1, G2 of the coupling element 3 via two short-circuit through-holes of the dielectric substrate 2. More specifically, as shown in FIG. 6, the dielectric substrate 2 is formed with a second through-hole 2*b* connected to the short-circuit point G1 of the coupling element 3 and a third through-hole 2*c* connected to the short-circuit point G2 of the coupling element 3. The second through-hole 2*b* is in contact with the upper end of the protrusion 4*a* via a contact electrode 6 positioned on the back surface of the dielectric substrate 2. Likewise, the third through-hole 2*c* is in contact with the upper end of the protrusion 4*a* via a contact electrode 7 positioned on the back surface of the dielectric substrate 2. Accordingly, the second through-hole 2*b* serves as a short-circuit element for short-circuiting between the short-circuit point G1 and the ground plane 4, and the third through-hole 2*c* serves as a short-circuit element for short-circuiting between the short-circuit point G2 and the ground plane 4**.

As can be understood from the above explanation, the protrusion **4*a* plays a role of a location at which the feed terminal 5 is positioned (in other words, a housing for the feeder cable 10) and a role of electric connection between the short-circuit elements 2*b* and 2*c* and the ground plane 4. As can be seen from FIGS. 1 and 5, in the present embodiment, the feed point P1, the short-circuit point G1, and the short-circuit point G2 are positioned in line. The protrusion 4*a*** extends in a straight line, along which the feed point P1, the short-circuit point G1, and the short-circuit point G2 are positioned to face the upper end of the protrusion 4*a*.

According to the present embodiment, as described above, the ground plane 4 includes the base portion 4*c* and the protrusion 4*a* formed by bending a portion of the ground plane 4, wherein the upper end of the protrusion 4*a* is in contact with the back surface of the dielectric substrate 2, and the base portion 4*c* faces the back surface of the dielectric substrate 2 with the gap therebetween. Further, the back surface side of the upper end of the protrusion 4*a* includes the feed terminal 5, and the feeder cable 10 can be housed in the hollow portion positioned inside the protrusion 4*a*. Therefore, a sufficient distance between the coupling element 3 and the ground plane 4 can be ensured without increasing the height of the coupler 1. Two conflicting problems, i.e., achievement of a low profile and reduction of energy loss, can be solved with the simple structure.

Further, when the coupler is formed wherein the ground plane 4 and the coupling element 3 are in contact with the substrate 2, the thickness of the substrate 2 is thinner than that of a coupler that does not have any protrusion 4*a*. Alternatively, the distance between the ground plane 4 and the coupling element 3 becomes longer. Therefore, the degree of coupling between the ground plane 4 and the coupling element 3 becomes weaker. As a result, more energy can be used for communication.

In the example of FIG. 5, the substrate 2 and the ground plane 4 are brought into direct contact. However, the example of FIG. 5 may be modified. For example, a ground element may be positioned at a portion of the substrate 2 which is in contact with the ground plane 4, so as to electrically connect the ground element to the ground plane 4.

Subsequently, the shape of the coupling element 3 will be described. The coupling element 3 has a planar shape. The coupling element 3 has a shape described below in a plane perpendicular to the thickness direction of the coupling element 3.

Figure 7:
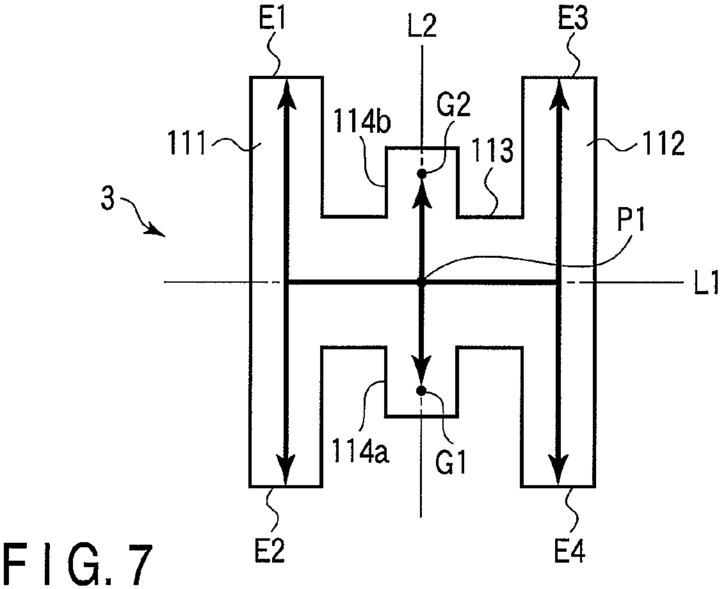
FIG. 7 is an exemplary top view illustrating a shape of a coupling element positioned in the coupler according to the embodiment.

As shown in FIGS. 1 and 7, the coupling element 3 includes two elements (rectangular elements) 111, 112 spaced from each other and positioned in parallel. The coupling element 3 includes a coupling element 113 extending so as to connect the central portions of the rectangular elements 111, 112. In other words, the coupling element 3 has a substantially H-shaped form. Two additional elements 114*a*, 114*b* extend, from the central portion of the coupling element 113, in a direction crossing the direction in which the coupling element 113 extends (for example, a direction perpendicular to the direction in which the coupling element 113 extends). For example, the feed point P1 is positioned at the center of the coupling element 3 (center of the coupling element 113) or in proximity thereto. For example, the short-circuit point G1 is positioned at an open end portion of the element 114*a*. For example, the short-circuit point G2 is positioned at an open end portion of the element 114*b*. Each of the elements 111, 112, 113, 114*a*, 114*b* has such a width as to allow a high-frequency signal exchanged with another coupler to flow substantially throughout the region.

Since the coupling element 3 has the substantially H-shaped form, the coupling element 3 has four open ends E1, E2, E3, E4 except for the short-circuit points G1, G2 as shown in FIG. 7. An electrical length between the feed point P1 of the coupling element 3 and each of the open ends E1, E2, E3, E4 is ¼ of a wavelength λ corresponding to a center frequency of an electromagnetic wave (high-frequency signal) transmitted and received by the coupler 1. The electrical length corresponds to a length of an electric current path from the feed point P1 to the open end. If the size of the coupling element 3 can be increased, the electrical length between the feed point P1 and each of the open ends E1, E2, E3, E4 may be, for example, λ/2 or λ. In other words, the electrical length between the feed point P1 and each open end may be an integral multiple of ¼ of the wavelength λ corresponding to the center frequency of the electromagnetic wave.

The electric current path of the coupling element 3 is represented by a thick line as shown in FIG. 7.

In other words, the electric current path includes a first electric current path extending from the feed point P1 to the rectangular element 111 via the coupling element 113 and a second electric current path extending from the feed point P1 to the rectangular element 112 via the coupling element 113. The electric current is generated throughout the coupling element 113. Accordingly, the electric current path of the coupling element 113 may be deemed to pass through the central portion of the coupling element 113.

The electric current is generated throughout each of the rectangular elements 111, 112. Accordingly, the electric current path of the rectangular element 111 may be deemed to pass through the central portion of the rectangular element 111. Therefore, the first electric current path is divided into two at the central portion of the rectangular element 111, and extend toward end portions (open ends) E1, E2 of the rectangular element 111. Likewise, the electric current path of the rectangular element 112 may be deemed to pass through the central portion of the rectangular element 112. Therefore, the second electric current path is divided into two at the central portion of the rectangular element 112, and extend toward end portions (open ends) E3, E4 of the rectangular element 112.

In this way, four electric current paths are formed from the feed point P1 to the open ends E1, E2, E3, E4. A portion of each of the four electric current paths is common to the other electric current paths. The shape of the coupling element 3 is defined to satisfy, for example, the following conditions (1) to (3).

(1) The length of each of the four electric current paths substantially corresponds to ¼ of the wavelength λ of the center frequency of the high-frequency signal.

(2) The pattern shape of the coupling element 3 is substantially symmetrical with respect to a line L1.

(3) The pattern shape of the coupling element 3 is substantially symmetrical with respect to a line L2.

However, each of the lines L1, L2 passes through the center (the feed point P1) of the coupling element 3, and the lines L1, L2 are perpendicular to each other.

The four electric current paths extending from the feed point P1 to the open ends E1, E2, E3, E4 are hereinafter referred to as electric current paths CE1, CE2, CE3, CE4, respectively. The paths CE1 and CE3 are symmetrical with respect to the center (feed point P1) of the pattern of the coupling element 3. Likewise, the paths CE2 and CE4 are symmetrical with respect to the center (feed point P1) of the pattern of the coupling element 3. Further, the short-circuit point G1 and short-circuit point G2 are positioned at positions symmetrical with respect to the center (feed point P1) of the pattern of the coupling element 3. Accordingly, in the coupling element 3, the electric current uniformly flows from the center of the coupling element 3 in the plurality of directions which are symmetrical with respect to the center of the coupling element 3. Therefore, an electromagnetic field needed for electromagnetic coupling between the couplers can be efficiently radiated. Further, the elements 111, 112 and the ground plane 4 are sufficiently spaced from each other. Therefore, the amount of energy leaked from the coupling element 3 to the ground plane 4 can be sufficiently reduced.

In the present embodiment, the protrusion 4*a* extends such that the upper end of the protrusion 4*a* is positioned under the center of the pattern of the coupling element 3. For example, the protrusion 4*a* may extend along the line connecting the short-circuit point G1, the feed point P1, and the short-circuit point G2 wherein each of the short-circuit point G1, the feed point P1, and the short-circuit point G2 are aligned with the upper end of the protrusion 4*a*. In other words, the protrusion 4*a* may extend in a direction crossing (i.e., direction perpendicular to) the direction in which the coupling element 113 extends. Therefore, the protrusion 4*a* is present directly under the short-circuit point G1, the feed point P1, and the short-circuit point G2. Further, a portion of the coupling element 113 and the rectangular elements 111, 112 are not positioned over the upper end of the protrusion 4*a* but are positioned over the base portion 4*c*. Therefore, this can efficiently prevent electromagnetic coupling between the coupling element 3 and the ground plane 4.

The shape of the coupling element 3 is not limited to the shape shown in FIG. 1. The coupling element 3 may be formed substantially crank shaped as shown in FIG. 8.

Figure 8:
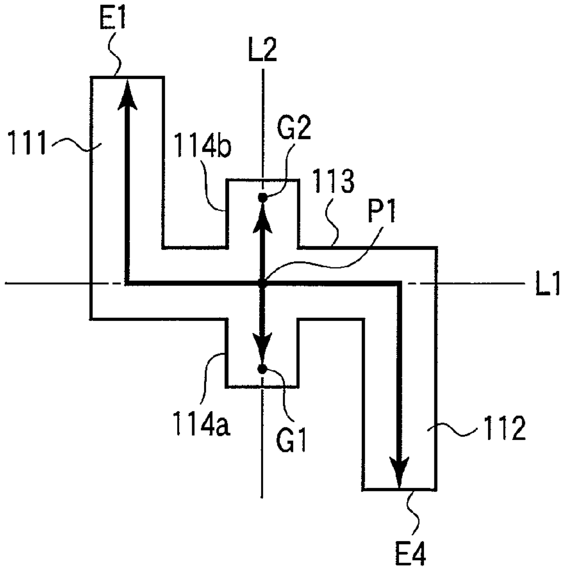
FIG. 8 is an exemplary top view illustrating another example of the shape of the coupling element positioned in the coupler according to the embodiment.

In the coupling element 3 shown in FIGS. 1 and 8, the number of short-circuit points (i.e., the number of short-circuit elements for short-circuiting between the coupling element 3 and the ground plane 4) is not limited to two. For example, only one short-circuit point may be arranged. Alternatively, four or more short-circuit points may be arranged.

Figure 9A:
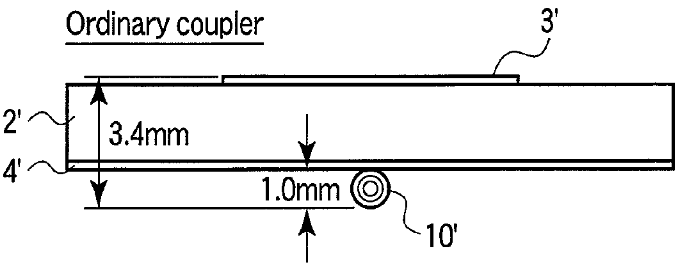
FIG. 9A is an exemplary view illustrating an ordinary coupler.

Subsequently, explanation will be made with reference to FIGS. 9A and 9B to compare the coupler 1 (FIG. 9B) according to the present embodiment with a coupler using a flat ground plane (ordinary coupler) (FIG. 9A). In this case, as shown in FIG. 9A, the ordinary coupler is assumed to include a dielectric substrate 2', a coupling element 3', and a ground plane 4'. In the ordinary coupler, it is necessary to arrange a feeder cable 10' below the ground plane 4'. Therefore, the overall height of the coupler increases by the diameter of the feeder cable 10'. The characteristics of the ordinary coupler are determined by the thickness of the dielectric substrate 2'. Therefore, it is necessary to use a sufficiently thick substrate as the dielectric substrate 2' in order to avoid coupling between the coupling element 3' and the ground plane 4'.

Figure 9B:
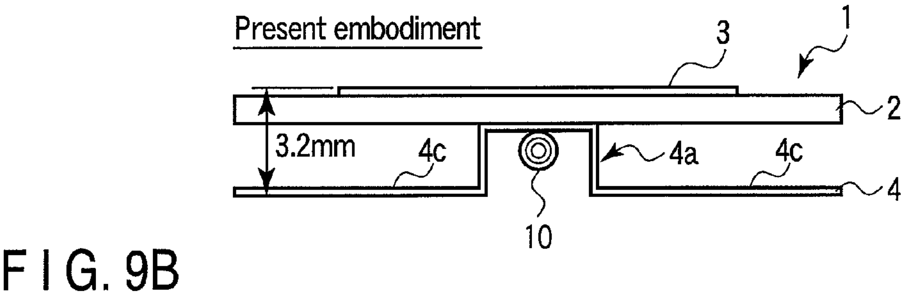
FIG. 9B is an exemplary view illustrating the coupler according to the embodiment for comparison with the ordinary coupler shown in FIG. 9A.

In the coupler 1 according to the present embodiment shown in FIG. 9B, the groove space of the protrusion 4*a* of the ground plane 4 serves as a cable guide for housing the feeder cable 10. The characteristics of the coupler 1 are determined by the distance between the coupling element 3 and the base portion 4*c* of the ground plane 4. Therefore, even when a thin, standard substrate (1.6 mm) is used as the dielectric substrate 2, the distance between the coupling element 3 and the ground plane 4 can be sufficiently ensured. On the other hand, the height of the coupler 1 is not affected by the feeder cable 10. Therefore, with the simple structure, the coupler can have a low profile, and at the same time, the energy loss can be reduced.

Figure 10:
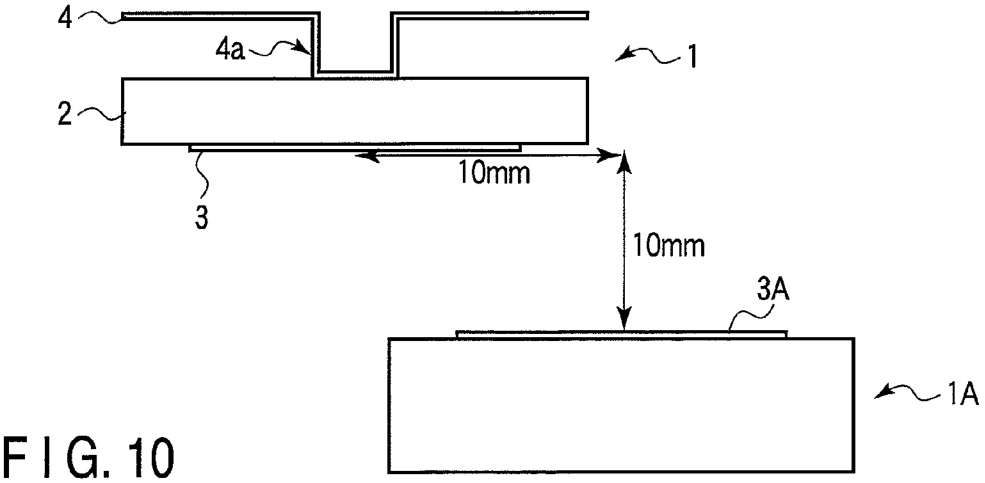
FIG. 10 is an exemplary view for explaining measurement conditions used for measuring the characteristics of the coupler according to the embodiment.
Figure 11:
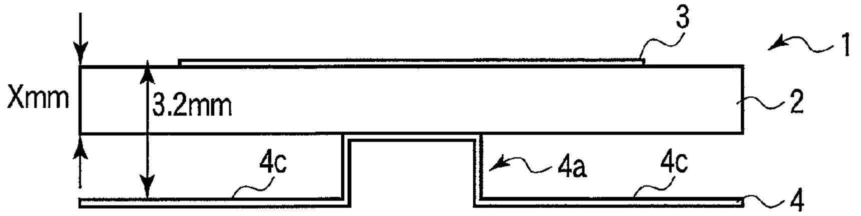
FIG. 11 is an exemplary view for explaining parameters used to measure the characteristics of the coupler according to the embodiment.
Figure 12:
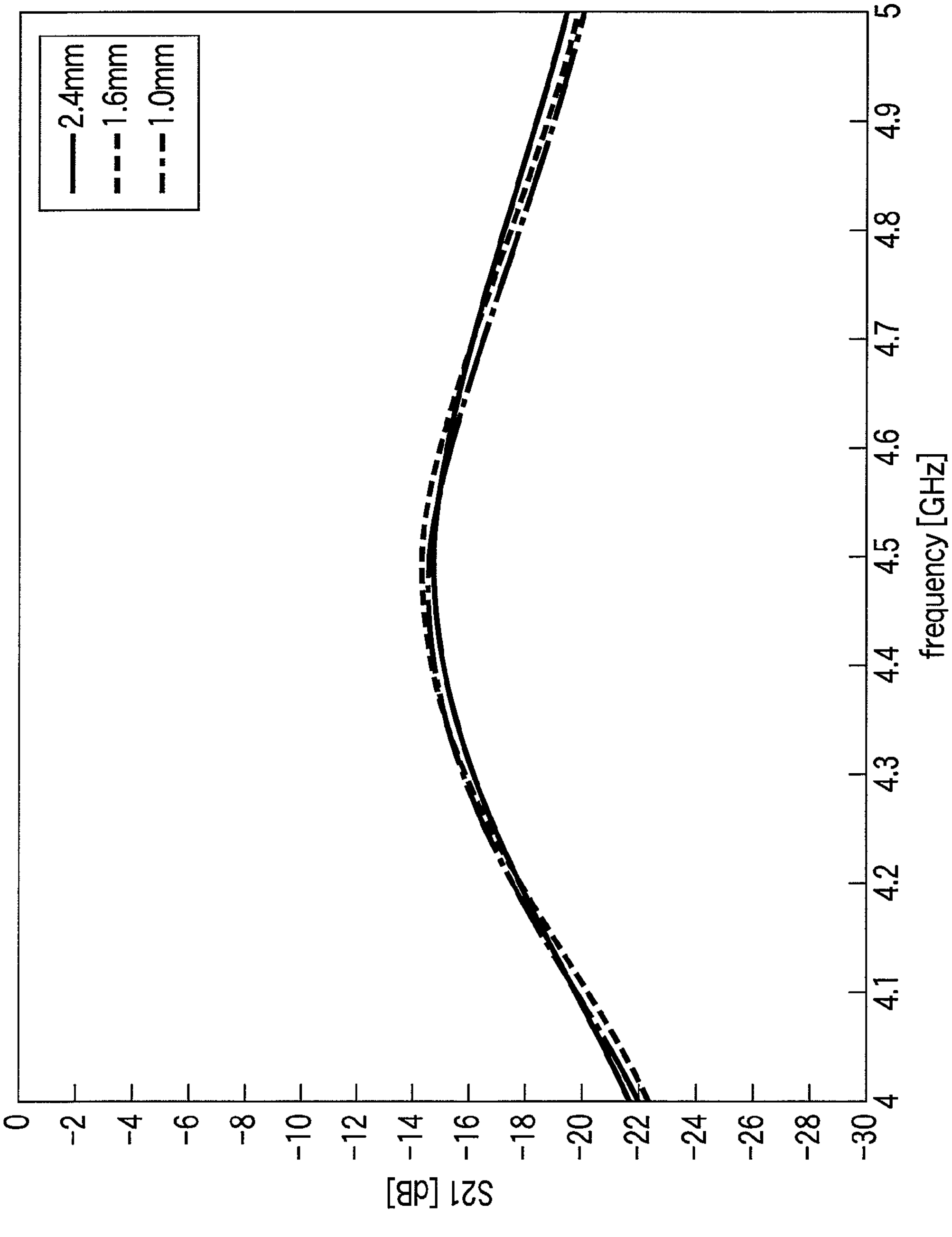
FIG. 12 is an exemplary view illustrating the characteristics of the coupler according to the embodiment.

Subsequently, a result of characteristics measurement of the coupler 1 will be described with reference to FIGS. 10, 11, and 12. FIGS. 10 and 11 illustrate measurement conditions. FIG. 12 illustrates the characteristics of the coupler 1. The horizontal axis of FIG. 12 represents a frequency. The vertical axis of FIG. 12 represents a transmission coefficient (S21 [dB]).

The measurement condition is as follows.

As shown in FIG. 10, the distance between the coupling element 3 of the coupler 1 and a coupling element 3A of a reference coupler 1A is 10 mm, and an offset between the couplers 1 and 1A is 10 mm. As shown in FIG. 11, the distance between the coupling element 3 and the base portion 4*c* of the ground plane 4 is 3.2 mm.

The characteristics of the coupler 1 are measured by changing a thickness x of the dielectric substrate 2 to 2.4 mm, 1.6 mm, and 1.0 mm while the distance between the coupling element 3 and the base portion 4*c* of the ground plane 4 is fixed at 3.2 mm. As can be understood from FIG. 12, a sufficient distance between the coupling element 3 and the base portion 4*c* of the ground plane 4 provides sufficient coupler characteristics even when the thickness of the dielectric substrate 2 is thin.

Subsequently, another example of a configuration of the coupler 1 according to the present embodiment will be described with reference to FIG. 13.

Figure 13:
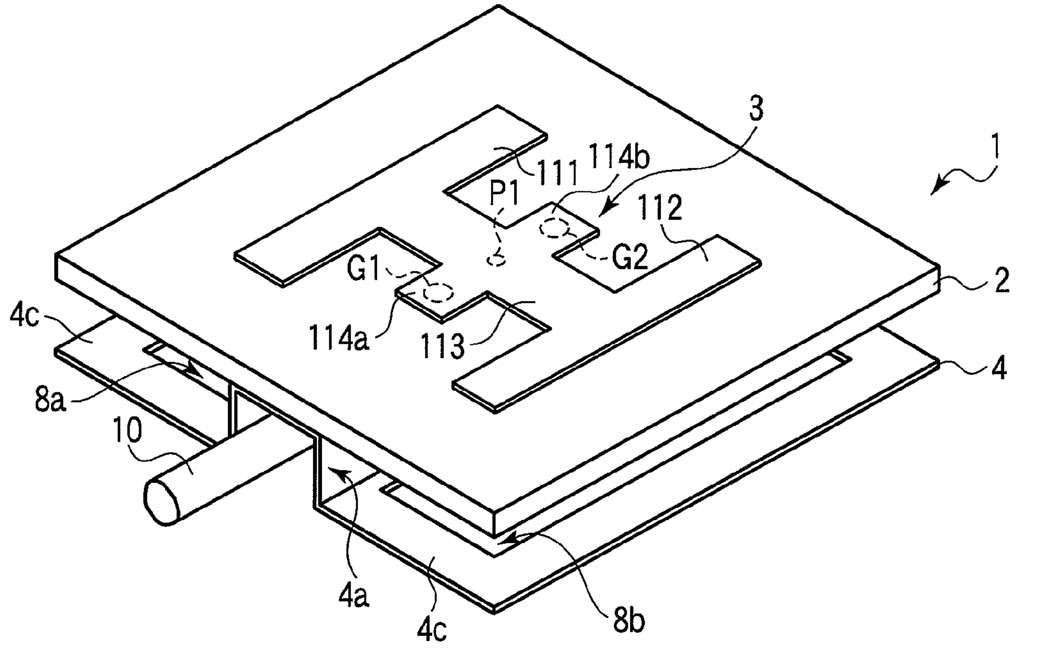
FIG. 13 is an exemplary perspective view illustrating another example of a structure of a coupler according to the embodiment.
Figure 14:
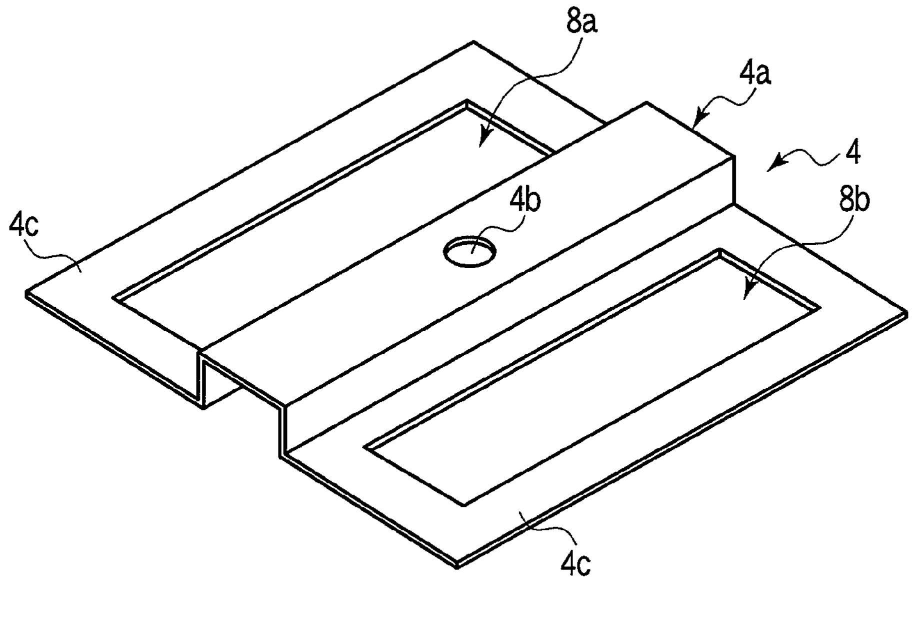
FIG. 14 is an exemplary perspective view illustrating an example of a structure of a ground plane included in the coupler of FIG. 13.

The coupler 1 of FIG. 13 has the same structure as the coupler 1 of FIG. 1 except that the base portion 4*c* of a bottom board 4 includes openings 8*a*, 8*b* formed along an outline of a portion of the coupling element 3. Each of the openings 8*a*, 8*b* can be formed by cutting portions of the base portion 4*c* of the bottom board 4. The openings 8*a*, 8*b* have, for example, substantially rectangular shapes as shown in FIG. 14. Each of the openings 8*a*, 8*b* affects the coupler 1 so as to improve the characteristics of the coupler 1. This is because the coupling between the coupling element 3 and the ground plane 4 can be reduced by the openings 8*a*, 8*b*, and accordingly, the energy loss caused by the coupling between the coupling element 3 and the ground plane 4 can be reduced. For example, the opening 8*a* can be formed in a region of the base portion 4*c* under the rectangular element 111. Likewise, for example, the opening 8*b* can be formed in a region of the base portion 4*c* under the rectangular element 112.

Subsequently, another example of a configuration of the coupler 1 according to the present embodiment will be described with reference to FIG. 15.

Figure 15:
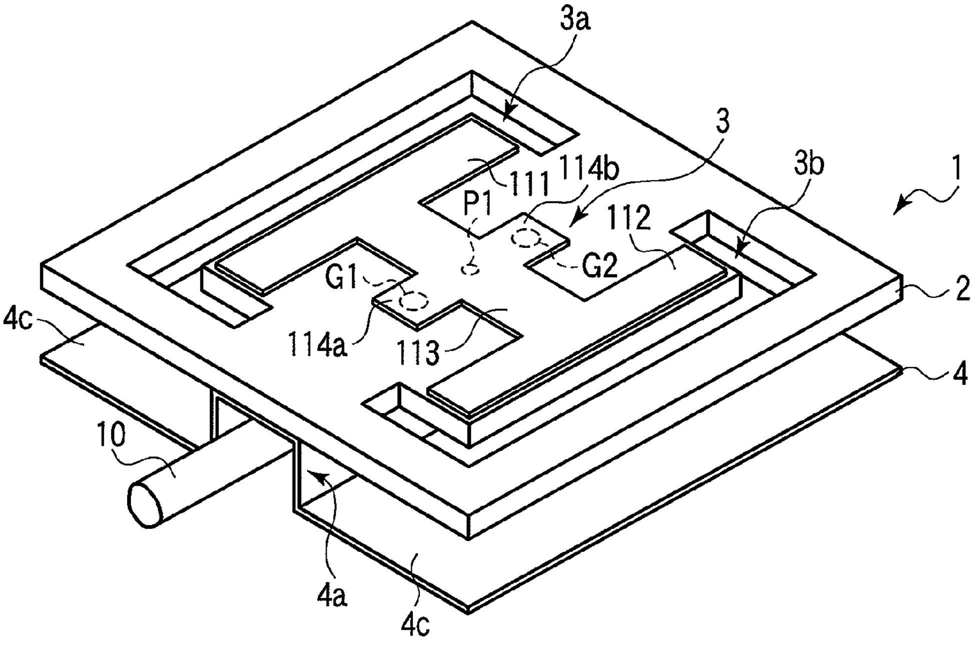
FIG. 15 is an exemplary perspective view illustrating still another example of a structure of the coupler according to the embodiment.

The coupler 1 of FIG. 15 has the same structure as the coupler 1 of FIG. 1 except that the dielectric substrate 2 includes openings 3*a*, 3*b*. Each of the openings 3*a*, 3*b* can be formed by cutting portions of the dielectric substrate 2, which are in proximity to the coupling element 3. Each of the openings 3*a*, 3*b* affects the coupler 1 so as to improve the characteristics of the coupler 1. This is because a dielectric constant of the dielectric substrate 2 can be reduced by the openings 3*a*, 3*b*, and accordingly, the coupling between the coupling element 3 and the ground plane 4 can be weakened. For example, the through-hole 3*a* can be formed in a region at an external peripheral side of the rectangular element 111. Likewise, for example, the through-hole 3*b* can be formed in a region at an external peripheral side of the rectangular element 112.

Subsequently, another example of a configuration of the coupler 1 according to the present embodiment will be described with reference to FIG. 16.

Figure 16:
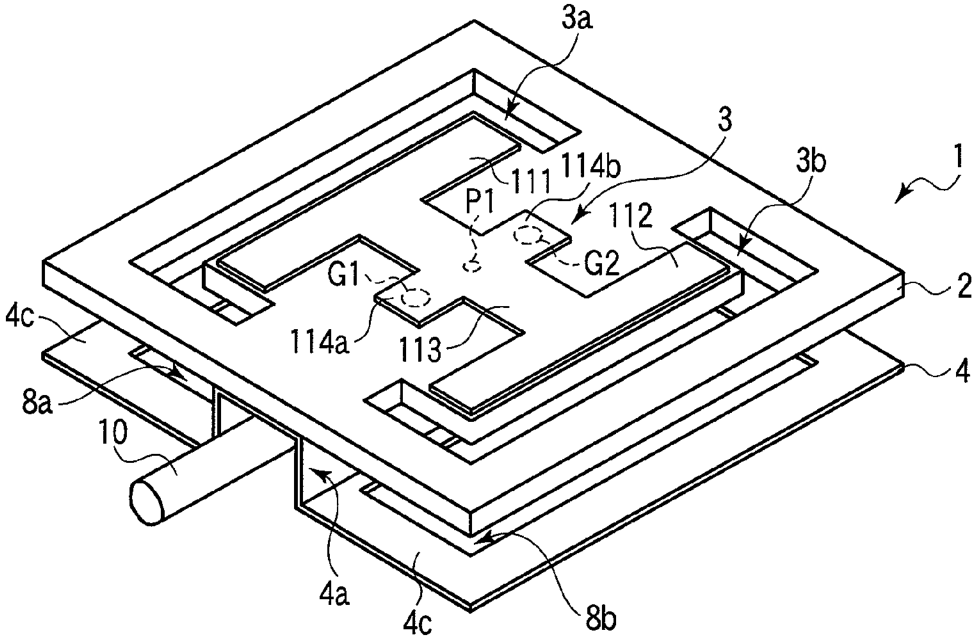
FIG. 16 is an exemplary perspective view illustrating yet another example of a structure of the coupler according to the embodiment.

The coupler 1 of FIG. 16 has the same structure as the coupler 1 of FIG. 1 except that the base portions 4*c* of the ground plane 4 include openings 8*a*, 8*b*, and that the dielectric substrate 2 includes the openings 3*a*, 3*b*.

For example, the opening 8*a* may be formed in a region of the base portion 4*c* under the through-hole 3*a*, or in a region of the base portion 4*c* under both of the through-hole 3*a* and the rectangular element 111. Likewise, the opening 8*b* may be formed in a region of the base portion 4*c* under the through-hole 3*b*, or in a region of the base portion 4*c* under both of the through-hole 3*b* and the rectangular element 112. When the through-holes are positioned on both of the ground plane 4 and the dielectric substrate 2, the coupling between the coupling element 3 and the ground plane 4 can be further weakened.

Figure 17:
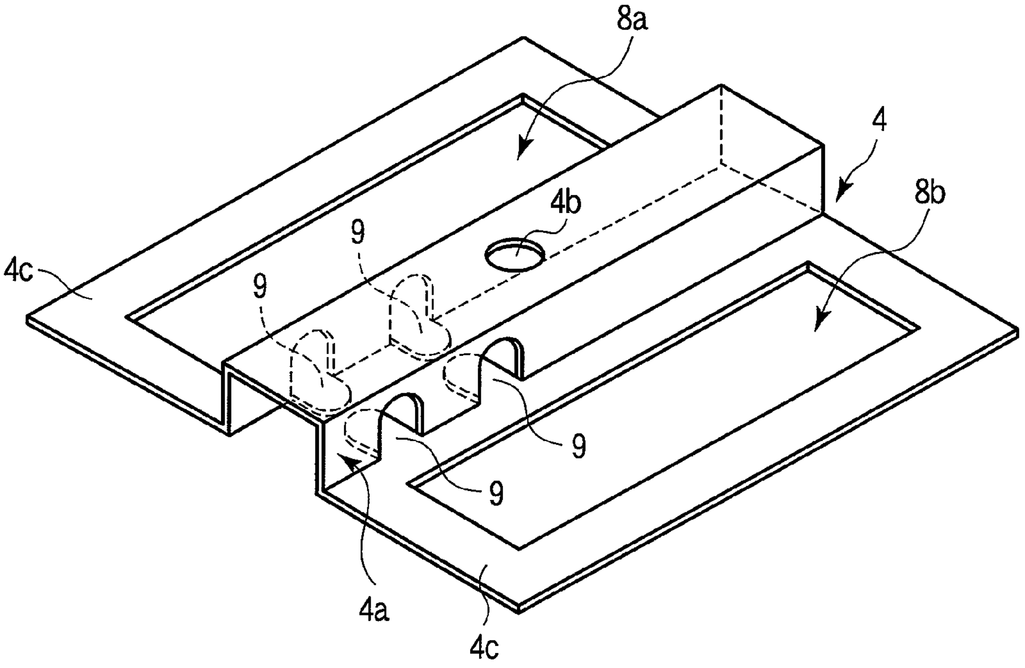
FIG. 17 is an exemplary perspective view illustrating another example of a structure of a ground plane included in the coupler according to the embodiment.

FIG. 17 illustrates another example of a configuration of the ground plane 4 used in the coupler 1.

The ground plane 4 of FIG. 17 includes several support members 9 at lateral sides of the protrusion 4*a* in order to prevent the feeder cable 10 from dangling. For example, each of the support members 9 protrudes from lateral surface sides of the protrusion 4*a* to the inside of the protrusion 4*a*. For example, each of the support members 9 can be formed by cutting and raising a portion of a lateral side wall of the base portion 4*c*, i.e., bending the portion of the lateral side wall of the base portion 4*c* into the inside of the protrusion 4*a* along the incision.

FIG. 17 shows the example in which each of lateral side walls of the protrusion 4*a* includes two support members 9.

Figure 18:
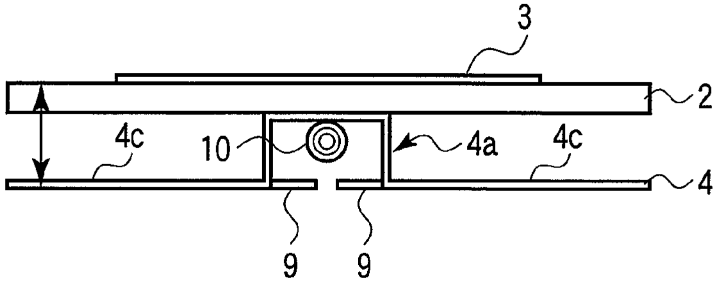
FIG. 18 is an exemplary front view illustrating a structure of the coupler including the ground plane of FIG. 17.

As shown in FIG. 18, the support members 9 are positioned at the bottom of the protrusion 4*a*. Therefore, even when the coupler 1 is positioned such that the coupling element 3 is positioned at an upper side and the ground plane 4 is positioned at a lower side, this arrangement prevents the feeder cable 10 from dangling.

It should be noted that an independent member different from the ground plane 4 may be used as the support member 9.

Subsequently, another example of a configuration of the coupler 1 according to the present embodiment will be described with reference to FIG. 19.

Figure 19:
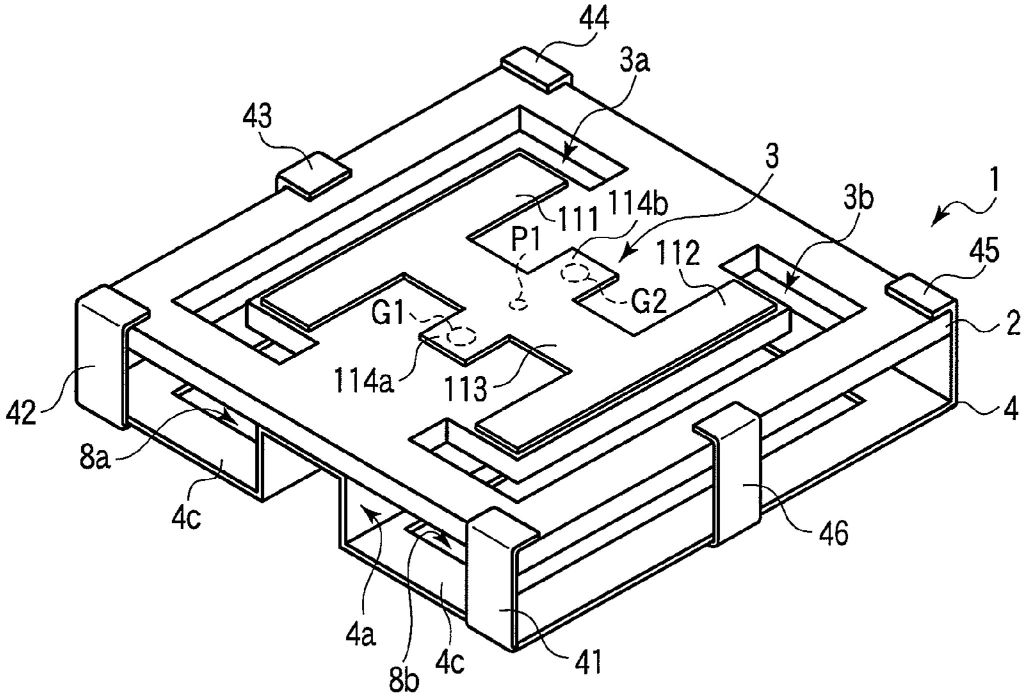
FIG. 19 is an exemplary perspective view illustrating still another example of a structure of the coupler according to the embodiment.

The coupler 1 of FIG. 19 includes a plurality of support members 41, 42, 43, 44, 45, 46 extending from end portions of the ground plane 4 so as to join end portions of the dielectric substrate 2 and end portions of the ground plane 4. Each of these support members 41, 42, 43, 44, 45, 46 protrudes from an end portion of the ground plane 4, i.e., an end portion of the base portion 4*c*, and is bent upward at the end portion of the ground plane 4. Further, a leading end portion of each of these support members 41, 42, 43, 44, 45, 46 is bent so that the fore-end portion is positioned at an upper surface of the dielectric substrate 2. The fore-end portion of each of these support members 41, 42, 43, 44, 45, 46 servers as a hook for engaging an end portion of the dielectric substrate 2.

The dielectric substrate 2 can be fixed to the ground plane 4 by these support members 41, 42, 43, 44, 45, 46. The support members 41, 42, 43, 44, 45, 46 may be applied to the coupler structure of any one of FIGS. 1, 13, and 15.

In the above explanation, each of the dielectric substrate 2 and the ground plane 4 has substantially the same width and substantially the same length. However, the present embodiment is not limited thereto. For example, the dielectric substrate 2 may have the shape shown in FIG. 20 or 22.

Figure 20:
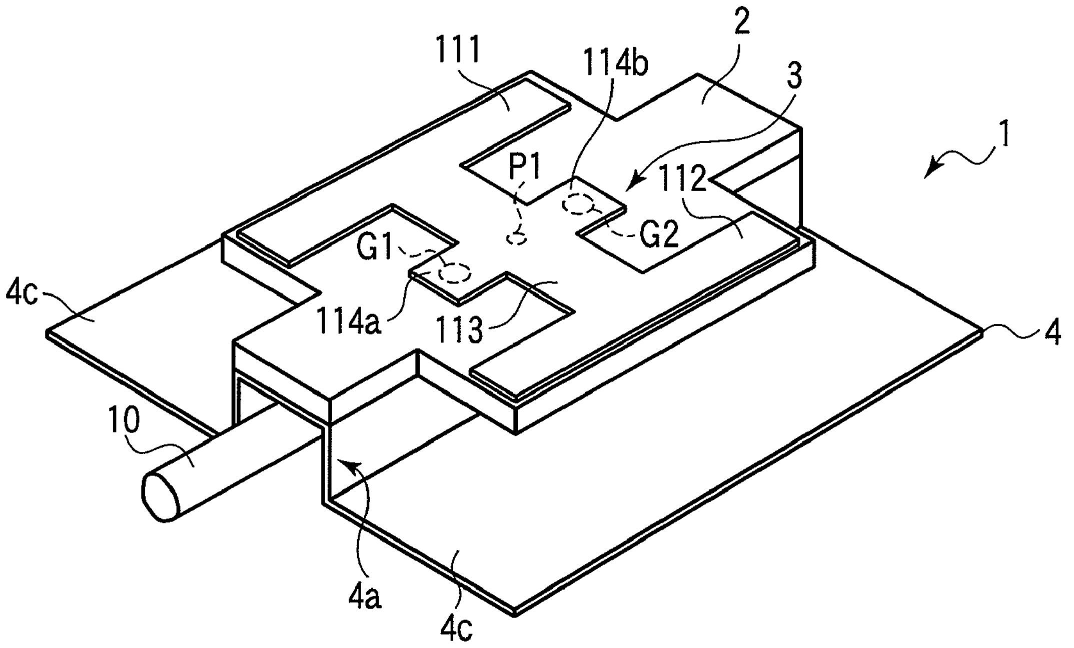
FIG. 20 is an exemplary perspective view illustrating yet another example of a structure of the coupler according to the embodiment.
Figure 21:
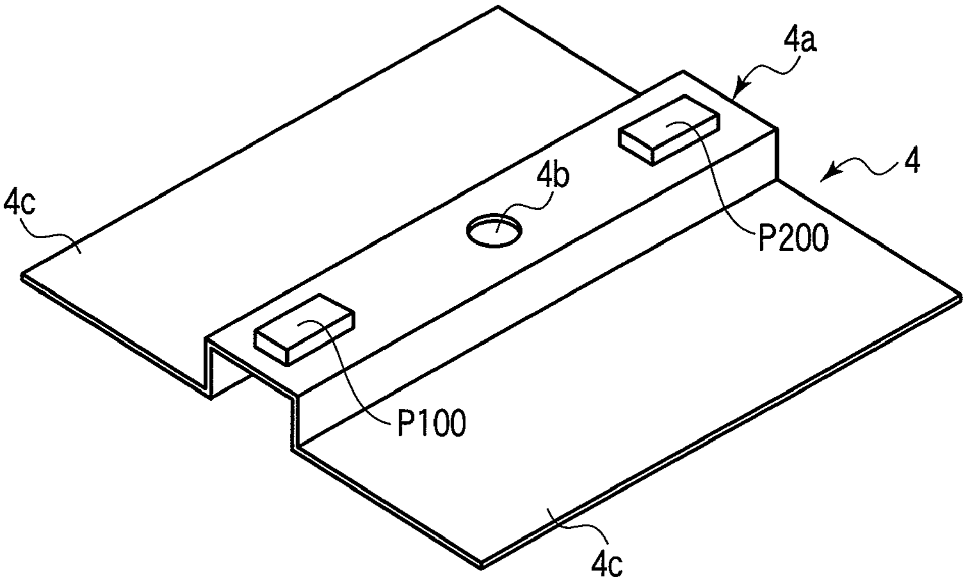
FIG. 21 is an exemplary perspective view illustrating an example of a structure of a ground plane used in the coupler of FIG. 20.

The coupler 1 of FIG. 20 is different from the coupler 1 of FIG. 1 in that portions of the coupling element 3 on an external peripheral side of the coupling element 3 are cut off, but the coupler 1 of FIG. 20 has the same structure as the coupler 1 of FIG. 1 with respect to the remaining features. More specifically, in the coupler 1 of FIG. 20, the dielectric substrate 2 includes a rectangular first portion having the coupling element 3 positioned on the surface thereof and two extension portions extending from external peripheries of the first portion (for example, two sides of the first portion which are opposite to each other). The width and the length (or depth) of the first portion are respectively less than the width and the length (or depth) of the ground plane 4. The two extension portions extend along the protrusion 4*a*. When the coupler structure of FIG. 20 is used, the upper surface of the protrusion 4*a* may be provided with fixing members (for example, pins) P100, P200 as shown in FIG. 21. The fixing members P100, P200 are used to couple the protrusion 4*a* of the ground plane 4 and the dielectric substrate 2.

Figure 22:
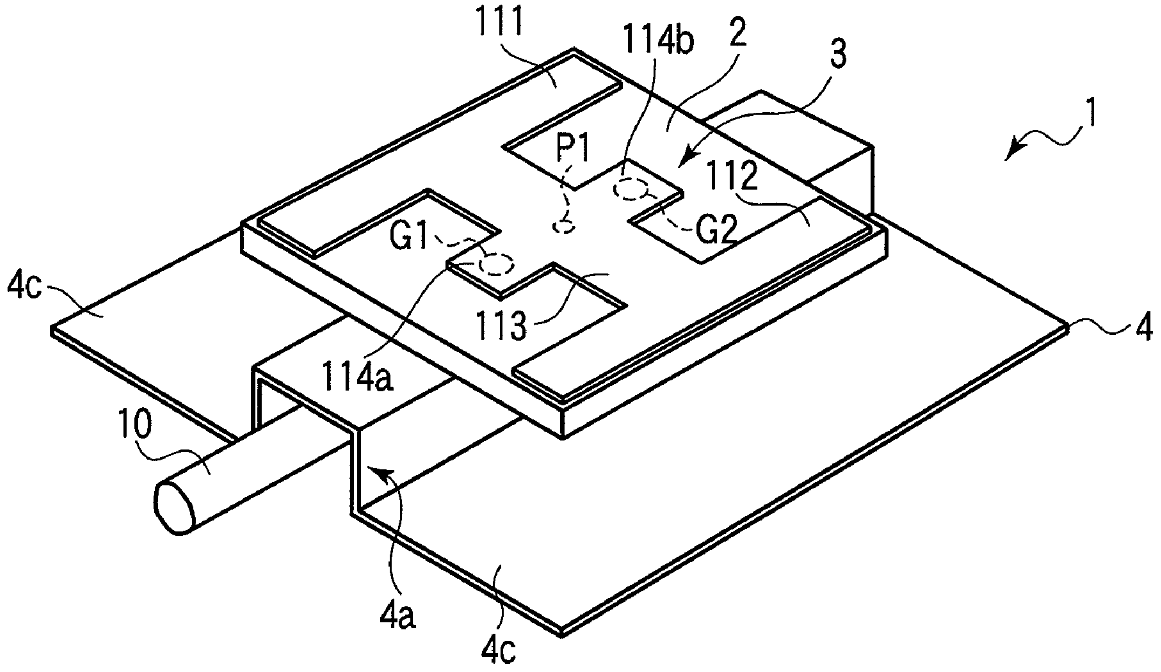
FIG. 22 is an exemplary perspective view illustrating still another example of a structure of the coupler according to the embodiment.

Further, the above two extension portions are not always necessary. For example, as shown in FIG. 22, the two extension portions may not be arranged.

Figure 23:
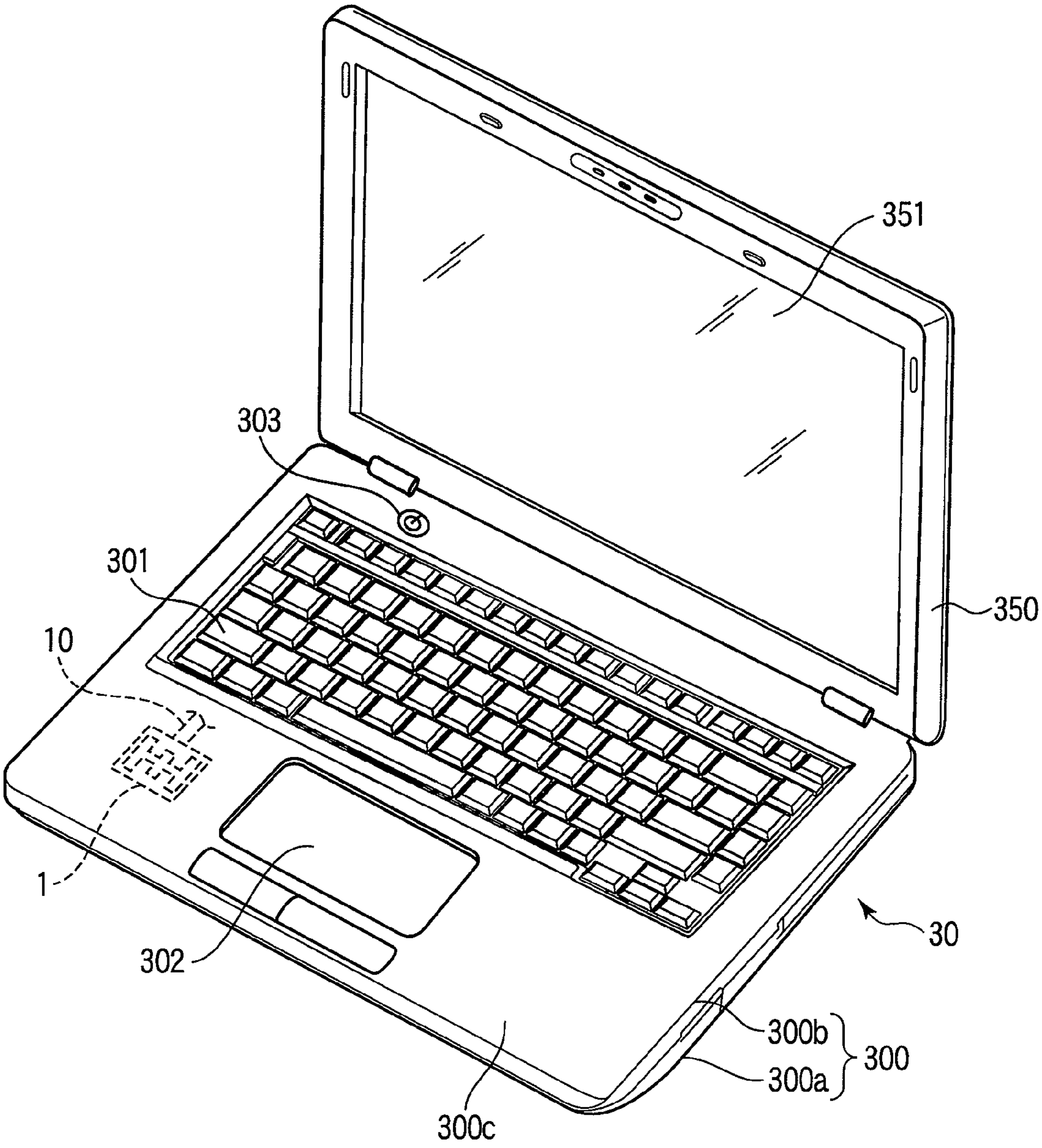
FIG. 23 is an exemplary perspective view illustrating an external appearance of an electronic apparatus positioned with the coupler according to the embodiment.

FIG. 23 is a perspective view illustrating an external appearance of an electronic apparatus provided with the coupler 1. This electronic apparatus 30 is realized as an information processing apparatus, e.g., the notebook-type portable personal computer 30 that can run on battery.

The computer 30 includes a main body 300 and a display unit 350. The display unit 350 is rotatably supported by the main body 300. The display unit 350 rotates between an open position at which the upper surface of the main body 300 is exposed and a closed position at which the upper surface of the main body 300 is covered. The display unit 350 includes a liquid crystal display (LCD) 351.

Figure 25:
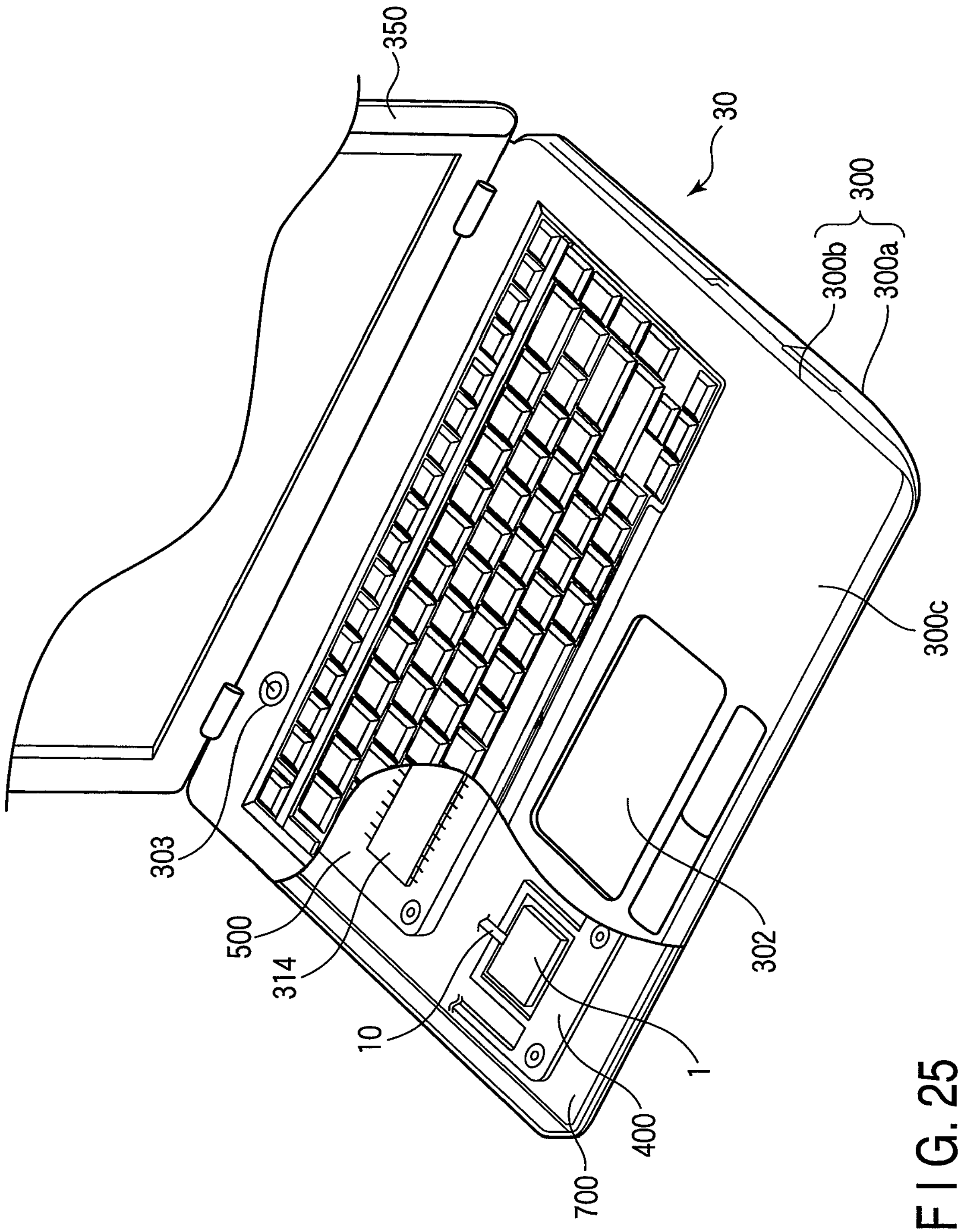
FIG. 25 is an exemplary cutaway perspective view illustrating the inside of a casing of the electronic apparatus in which a portion of a top cover of the electronic apparatus of FIG. 23 is cut away.

The main body 300 has a thin box-shaped body. The casing of the main body 300 includes a lower case 300*a* and a top cover 300*b* engaged therewith. The upper surface of the main body 300 includes a keyboard 301, a touch pad 302, a power switch 303, and the like. The coupler 1 is positioned in the main body 300. For example, the coupler 1 is positioned below a palm rest region 300*c* of the upper surface of the main body 300. The coupler 1 is positioned such that the coupling element 3 of the coupler 1 is close to the top cover 300*b* and the ground plane 4 of the coupler 1 is close to the lower case 300*a*. In this manner, a portion of the palm rest region 300*c* of the top cover 300*b* serves as a communication surface. For example, as shown in FIG. 25, the coupler 1 may be positioned such that a direction in which the protrusion 4*a* extends (longitudinal direction) is perpendicular to a direction in which a front wall of the main body 300 extends. Alternatively, the coupler 1 may be positioned such that the direction in which the protrusion 4*a* extends (longitudinal direction) is perpendicular to a direction in which a lateral wall of the main body 300 extends, which is not shown. In this direction, the feeder cable 10 can be pulled out of the coupler 1 from the lateral wall side or front wall side of the main body 300 to the inside of the main body 300. Normally, a communication device for executing close proximity wireless communication is positioned at an inner position of the main body 300 with respect to the lateral wall or the front wall of the main body 300. Therefore, the above-mentioned direction enables easy connection between the coupler 1 and the communication device via the feeder cable 10. In other words, the above-mentioned direction enables reduction of the cable length needed to connect between the coupler 1 and the communication device.

Figure 24:
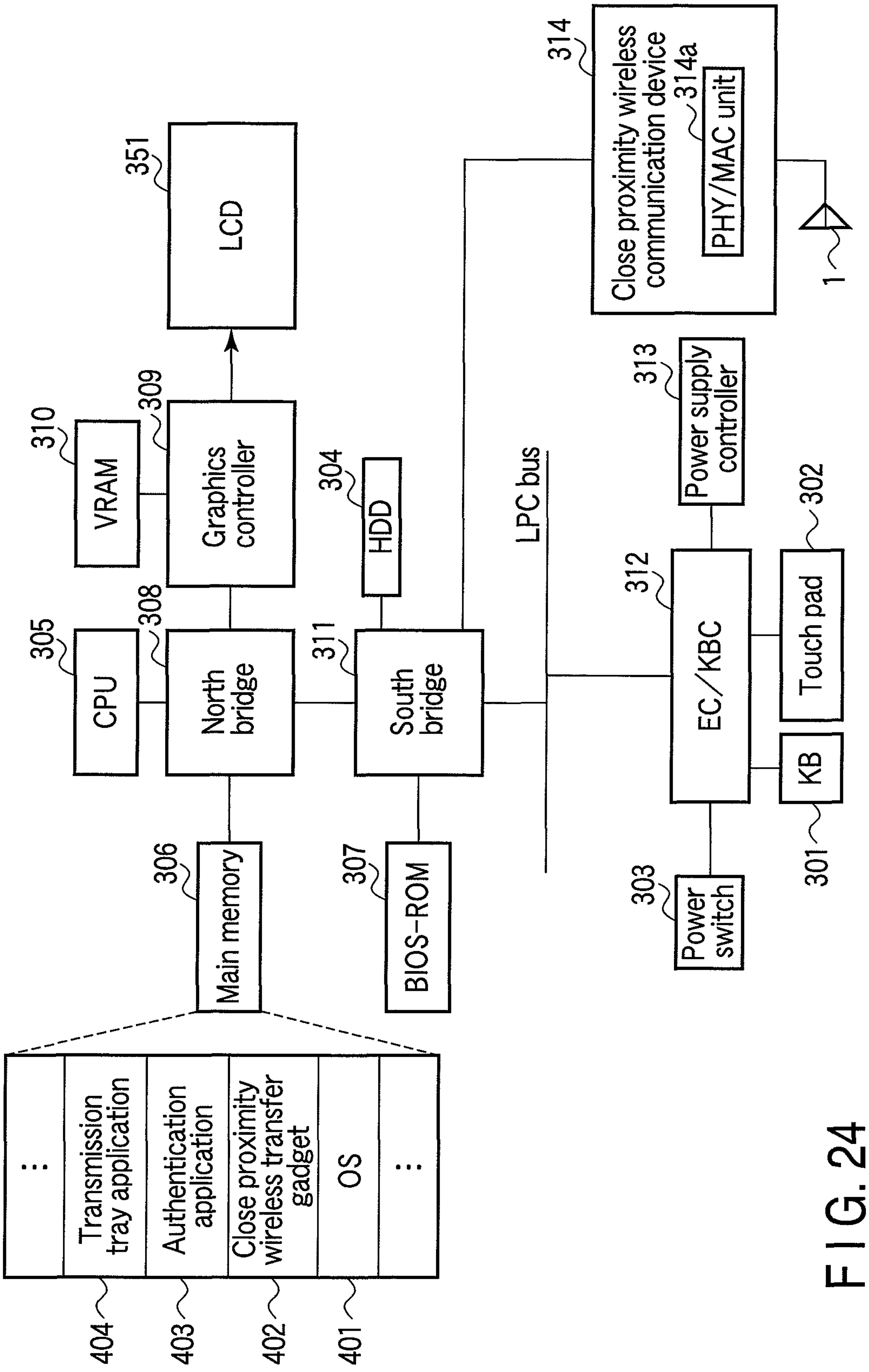
FIG. 24 is an exemplary block diagram illustrating a system configuration of the electronic apparatus of FIG. 23.

FIG. 24 is a block diagram illustrating a system configuration of the computer 30.

The computer 30 includes the coupler 1, the keyboard 301, the touch pad 302, the power switch 303, and the LCD 351. The computer 30 further includes a hard disk drive (HDD) 304, a CPU 305, a main memory 306, a Basic Input/Output System (BIOS) ROM 307, a north bridge 308, a graphics controller 309, a video memory (VRAM) 310, a south bridge 311, an embedded controller/keyboard controller IC (EC/KBC) 312, a power supply controller 313, and a close proximity wireless communication device 314.

The hard disk drive 304 stores codes for executing various kinds of programs such as an operating system (OS) and a BIOS update program. The CPU 305 is a processor for controlling operation of the computer 30 and executes various kinds of programs loaded to the main memory 306 from the hard disk drive 304. The programs executed by the CPU 305 include an operating system 401, a close proximity wireless transfer gadget application program 402, an authentication application program 403, or a transmission tray application program 404. The CPU 305 executes a BIOS program stored in the BIOS-ROM 307 for hardware control.

The north bridge 308 connects between the south bridge 311 and the local bus of the CPU 305. The north bridge 308 includes a memory controller for controlling access to the main memory 306. The north bridge 308 has a function for executing communication with the graphics controller 309 via an AGP bus. The graphics controller 309 controls the LCD 351. The graphics controller 309 generates, from display data stored in the video memory 310, a video signal representing a display image displayed on the LCD 351. The display data are written in the video memory 310 under the control of the CPU 305.

The south bridge 311 controls devices on an LPC bus. The south bridge 311 includes an ATA controller for controlling the hard disk drive 304. Further, the south bridge 311 includes a function for controlling access to the BIOS-ROM 307. The embedded controller/keyboard controller IC (EC/KBC) 312 is a one-chip integrated microcomputer including an embedded controller and a keyboard controller. The embedded controller controls the power supply controller according to user operation with the power switch 303 so as to turn on/off the information processing apparatus 30. The keyboard controller controls the keyboard 301 and the touch pad 302. The power supply controller 313 controls operation of a power source device, not shown. The power source device generates operating power for each unit of the information processing apparatus 30.

The close proximity wireless communication device 314 executes proximity wireless communication. The close proximity wireless communication device 314 includes a PHY/MAC unit 314*a*. The PHY/MAC unit 314*a* operates under the control of the CPU 305. The PHY/MAC unit 314*a* wirelessly transmits/receives signals via the coupler 1. This close proximity wireless communication device 314 is housed in the casing of the main body 300.

Data transfer between the close proximity wireless communication device 314 and the south bridge 311 is performed via, for example, a Peripheral Component Interconnect (PCI) bus. It should be noted that a PCI Express bus may be used instead of the PCI bus.

Subsequently, an internal structure of the main body (casing) 300 of the computer 30 will be described with reference to FIG. 25.

As shown in FIG. 25, a region in a central portion or at a far side of the main body (casing) 300 includes a main printed circuit board (motherboard) 500 having various kinds of electronic components. For example, the close proximity wireless communication device 314 is directly positioned on this main printed circuit board 500, or mounted via another printed circuit board. For example, the coupler 1 is positioned in a region at a closer side (front edge side) of the main body 300. The region in the front edge side is positioned below the palm rest region 300*c*.

The bottom surface of the lower case 300*a* includes an electromagnetic wave shielding layer 700. The coupler 1 is attached to a component attachment member 400 positioned on the electromagnetic wave shielding layer 700. The component attachment member 400 includes a recessed portion for housing the coupler 1. The coupler 1 is attached to the recessed portion. In this case, the coupler 1 is positioned in a direction in which the protrusion 4*a* extends in parallel with the lateral wall of the main body 300, i.e., a direction in which the feeder cable 10 is pulled out to the central portion of the main body 300.

The ground plane 4 of the coupler 1 faces the electromagnetic wave shielding layer 700 on the bottom surface of the lower case 300*a*. The height of the main body 300 in the region at front edge side is thinner than the thickness of the main body 300 in region in the central portion or at the far side. Therefore, the distance between the ground plane 4 and the electromagnetic wave shielding layer 700 is relatively shorter in the region at front edge side. Therefore, the electromagnetic wave shielding layer 700 can improve the ground reference of the ground plane 4.

As hereinabove described, according to the present embodiment, the upper end of the protrusion 4*a* of the ground plane 4 is in contact with the back surface of the dielectric substrate 2, and the base portion 4*c* of the ground plane 4 is positioned under the coupling element 3 on the dielectric substrate 2 with a gap therebetween. Therefore, the distance between the coupling element 3 and the ground plane 4 can be sufficiently ensured without increasing the thickness of the dielectric substrate 2, and the coupling between the coupling element 3 and the ground plane 4 can be weakened. Further, the back surface side of the upper end of the protrusion 4*a* includes the feed terminal 5, and the space in the protrusion 4*a* can be used as a space for housing the feeder cable 10. Therefore, with the simple structure, the coupler can have a low profile, and at the same time, the energy loss can be reduced.

The present invention is not limited to the above embodiment. When the present invention is embodied, constituent elements may be changed and embodied without deviating from the spirit of the present invention. Various kinds of inventions can be formed by appropriately combining a plurality of constituent elements disclosed in the above embodiment. For example, several constituent elements may be deleted from all the constituent elements shown in the embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna suitable for use in a close-proximity wireless system, the antenna comprising:

a substrate comprising a first surface and a second surface;

a coupling element configured to allow for transmission of an electromagnetic wave to and/or receipt of an electromagnetic wave from a wireless device in close proximity, wherein the coupling element is disposed proximal the first surface of the substrate and comprises a feed point at a central portion;

a ground plane proximal the second surface of the substrate, the ground plane comprising a base portion facing the second surface of the substrate and separated from the second surface of the substrate by a gap, and a protrusion comprising a first portion proximal the second surface of the substrate, comprising a first length in a first direction and a second length in a second direction, the first length being shorter than the second length, and disposed at a central portion in the first direction, and a second portion extending between an edge of the first portion in the first direction and the base portion of the ground plane; and a feed terminal comprising a first edge and a second edge, the first edge disposed within a space formed by the protrusion and extending via a through-hole in the substrate, and the second edge connected to the feed point of the coupling element.

2. The antenna of claim 1, wherein the base portion of the ground plane comprises an opening.

3. The antenna of claim 2, wherein the base portion comprises openings at both sides of the protrusion.

4. The antenna of claim 1, wherein the substrate comprises a first opening along an outline of a portion of the coupling element.

5. The antenna of claim 4, wherein the base portion comprises second openings, at least portions of the second openings being symmetric with respect to the feeding point.

6. The antenna of claim 1, wherein the base portion of the ground plane comprises a first opening, and the substrate comprises a second opening along an outline of the coupling element.

7. The antenna of claim 1, wherein the coupling element comprises open ends disposed at a substantially similar electrical length from the feed point of the coupling element, wherein the electrical length is an integer multiple of ¼of a wavelength corresponding to a center frequency of the electromagnetic wave.

8. The antenna of claim 1, wherein the coupling element comprises a short-circuit point, and the protrusion extends along a line connecting the feed point and the short-circuit point.

9. The antenna of claim 1, further comprising a support configured to connect an end of the ground plane and an end of the substrate.

10. The antenna of claim 1, wherein the protrusion is a bent portion of the ground plane.

11. The antenna of claim 1, further comprising a cable housed in the protrusion and connected to the feeding point.

12. A coupler comprising:

a substrate comprising a first surface and a second surface;

a coupling element proximal the first surface of the substrate and configured to allow for transmission of an electromagnetic wave to and/or receipt of an electromagnetic wave from a wireless device in close proximity, the coupling element comprising a short-circuit point, a feed point at a central portion, and open ends disposed at a substantially similar electrical length from the feed point, wherein the electrical length is an integer multiple of ¼of a wavelength corresponding to a center frequency of the electromagnetic wave;

a short-circuit element electrically connected to the short-circuit point of the coupling element;

a ground plane proximal the second surface of the substrate, wherein the ground plane comprises a base portion facing the second surface of the substrate and separated from the second surface of the substrate by a gap, and a protrusion extending along a line connecting the feed point and the short-circuit point, the protrusion comprising a first portion proximal the second surface of the substrate, the first portion comprising a first length in a first direction and a second length in a second direction, the first length being shorter than the second length, and disposed at a central portion in the first direction, and configured to electrically communicate with the short-circuit element, and a second portion extending between an edge of the first portion in the first direction and the base portion of the ground plane; and a feed terminal comprising a first edge and a second edge, the first edge disposed within a space formed by the protrusion and extending via a through-hole in the substrate, and the second edge connected to the feed point of the coupling element.

13. The coupler of claim 12, wherein the base portion of the ground plane comprises an opening.

14. The coupler of claim 12, wherein the protrusion is a bent portion of the ground plane.

15. The coupler of claim 12, wherein the second surface of the substrate comprises a dielectric material.

* * * * *